United States Patent Office 3,396,120
Patented Aug. 6, 1968

3,396,120
THERMOLUMINESCENT GLASS AND METHOD OF PREPARING THE SAME
Robert J. Ginther, Temple Hills, Md., assignor to the United States of America as represented by the Secretary of the Navy
No Drawing. Filed Apr. 30, 1965, Ser. No. 452,405
5 Claims. (Cl. 252—301.4)

ABSTRACT OF THE DISCLOSURE

A clear, transparent, colorless glass of lithium oxide alumina and silica sensitized with terbium oxide to yield an efficient thermoluminescence after exposure to high energy radiation. In the preparation of the glass, the melting of the ingredients and cooling of the glass melt are conducted in a reducing atmosphere.

---

The invention described herein may be manufactured and used by or for the Government of the United States of America for governmental purposes without the payment of any royalties thereon or therefor.

This invention relates to new glasses which are useful as the radiation sensitive element in thermoluminescence dosimetry of high energy radiation such as gamma and X-rays and to a method of producing the same.

A thermoluminescent material on exposure to high energy radiation will take up and store energy in the form of trapped electrons and when subsequently heated will release these electrons with development of a luminescent glow. The number of electrons trapped in the material is proportional to the intensity of the high energy radiation and hence the intensity of the luminescent glow can be employed for determination of the radiation dose. The luminescent glow may be observed with a photosensitive device such as a photomultiplier tube and the glow peak noted. The height of the glow peak may be used as the measure of the radiation dose.

Among the useful properties which are desirably present in a thermoluminescent material as the sensitive element for high energy radiation dosimetry are an adequate sensitivity for dosages in the range from a few milliroentgens to several thousands of roentgens, glow peaks which occur at temperatures which are high enough for the irradiated element to be stable on storage and yet not so high as to result in the development of incandescent light in the glow out procedure which would interfere with the recording of the glow peak emission, a low dependence of response to the energy of the exciting radiation, and a thermoluminescent emission spectrum at a wavelength to which photosensitive devices such as photomultiplier tubes are most sensitive and which is spectrally far removed from the red and infrared light generated by the heating procedure.

The radiation sensitive materials which have been commonly used in thermoluminescence dosimetry of high energy radiation are crystalline solids and generally used in powder form. Powders can be used only in limited thickness in the dosimetry. While the output of thermoluminescence will increase with increase in thickness of the powder layer, the amount of the light collected will be seriously diminished by light-scattering from powder particles. This difficulty could be overcome by the use of clear single crystals of the materials. However, either suitable crystals of the materials have not been prepared or where such have been made, they are not generally available. In any event, crystals of the materials are expensive and difficult to grow with reproducible properties.

It is an object of the present invention to increase the supply of materials which are useful as radiation sensitive elements in thermoluminescence dosimetry of high energy radiation.

It is a further object to provide clear glasses of a composition which exhibit desirable properties as a radiation sensitive element in thermoluminescence dosimetry of high energy radiation.

It is also an object to provide a method of producing clear glasses of the aforesaid kind.

The above and other objects are accomplished by the practice of my invention in which lithium oxide, alumina and silica are combined in clear glasses with a small amount of trivalent terbium and prepared by a method in which the melting of the ingredients and cooling of the glass melt to the solid form are conducted under reducing conditions.

The new radiation sensitive glasses of my invention are clear, transparent colorless products which contain the trivalent terbium as the oxide $Tb_2O_3$. The trivalent terbium sensitizes the glass so that it yields an efficient thermoluminescence, when, after irradiation, it is heated to temperatures of 200° C. and above. Development of a glow peak of optimum height is had at 260–265° C. and a useful auxiliary glow peak at 325° C. The glow-out temperatures for the irradiated glasses are high enough for good storage stability in the dosed glasses and low enough to avoid development of serious interference with discrimination between the luminescence signal and incandescent light developed in the glow-out heating. The thermoluminescence of the irradiated glasses has an emission spectrum suitable for recording by photosensitive devices such as a photomultiplier tube, being principally in the blue to ultraviolet region. The glasses have a low dependence of response on the energy of the exciting radiation by virtue of the presence in the base glass of essentially only oxides of low atomic number metals, namely, of lithium, aluminum and silicon.

Base glasses which may be sensitized with trivalent terbium in accordance with the invention contain lithium oxide, alumina and silica in the following relative proportions:

| Component: | Mole, percent |
|---|---|
| $Li_2O$ | 37–17 |
| $Al_2O_3$ | 15–1.0 |
| $SiO_2$ | 52–73 |

These base glasses without the trivalent terbium will not develop a useful intensity of thermoluminescence for dosimetry of high energy radiation. However, with the incorporation in these base glasses of a small amount of terbium oxide, from about $7 \times 10^{-5}$ to $7 \times 10^{-3}$ mole percent of the base glass composition, they are caused to possess the valuable properties described above for dosimetry of high energy radiation.

Preferred compositions for the base glasses are as follows:

| Component: | Mole, percent |
|---|---|
| $Li_2O$ | 18–33 |
| $Al_2O_3$ | 10–15 |
| $SiO_2$ | 57–67 | in which is incorporated a preferred amount of the terbium oxide which is from $3.5 \times 10^{-4}$–$2.1 \times 10^{-3}$ mole percent of the base glass.

A base glass of optimum composition contains 29 mole percent of $Li_2O$, 12 mole percent $Al_2O_3$ and 59 mole percent $SiO_2$ and an optimum concentration, .0014 mole percent of terbium oxide thereon, incorporated therein.

The new glass compositions of my invention may be prepared by dry blending the starting materials which may be oxides or carbonates, in pure form, placing the dry mix in a platinum crucible and adding a solution of a terbium salt thereto, for example, of terbium chloride, nitrate, sulfate, etc., in water, drying the mix and subjecting it to melting at temperatures of 1400–1500° C. under reducing conditions for a time sufficient to insure melting and mixing of the ingredients, usually about 10 to 16 hours. Cooling of the melt is made in the crucible and also under reducing conditions.

A convenient method for obtaining a suitable reducing atmosphere is to conduct the melting of the ingredients in a platinum crucible which is supported in an alumina crucible of about the same size. This crucible assembly is arranged in a longer cylindrical alumina crucible with a packing of powdered graphite between the crucible assembly and the longer crucible and the latter is tightly capped with platinum foil.

Example

A dry blend of 3.15 grams of lithium carbonate, 1.74 grams of alumina and 5.24 grams of silica is prepared by tumbling the mixture in a glass bottle on rollers for a period of about twenty minutes. The dry blend is placed in a platinum crucible of 50 ml. capacity and to it is added 6 ml. of a water solution of terbium chloride of a terbium concentration equivalent to .00013 gram of $Tb_4O_7$ per ml. The charge is dried in the crucible by heating (to about 150° C.) to evaporate the water and heated to and held at 1400 C. in a reducing atmosphere, provided in the manner described above, for a period of 12 to 16 hours to insure substantially complete melting and mixing.

The melt is removed from the furnace and allowed to cool to room temperature in the platinum crucible while maintaining the reducing atmosphere. The solidified glass is removed from the platinum crucible by spreading away the walls of the crucible. The glass may be annealed to remove strains by heating it at 450° C. for an hour or more following known glass annealing practice.

While the invention has been described herein with reference to certain specific embodiments thereof, it is intended that they shall be by way of illustration and not in limitation except as may be defined in the appended claims.

What is claimed is:

1. A method of forming a glass capable after exposure to high energy radiation of yielding an efficient thermoluminescence on heating which comprises subjecting a base glass mixture containing from about 17–37 mole percent lithium oxide, from about 1–15 mole percent alumina and from about 52–73 mole percent silica in which is present an amount of a terbium compound which will provide a $Tb_2O_3$ concentration in the finished glass which is from about $7 \times 10^{-5}$ to $7 \times 10^{-3}$ mole percent to melting under reducing conditions at a temperature of from about 1400 to 1600° C. for a time sufficient to obtain a complete melting and mixing of the components and cooling the resulting glass to room temperature while maintaining it under the reducing conditions.

2. A method as defined in claim 1, wherein the base glass mixture contains from about 18–33 mole percent lithium oxide, from about 10–15 mole percent alumina, from about 57–67 mole percent silica and an amount of a terbium compound which will provide a $Tb_2O_3$ concentration in the finished glass of from about $3.5 \times 10^{-4}$ to $2.1 \times 10^{-3}$ mole percent.

3. A method as defined in claim 1, wherein the base glass mixture contains from about 29 mole percent lithium oxide, about 12 mole percent alumina, about 59 mole percent silica and an amount of a terbium compound which will provide a $Tb_2O_3$ concentration in the finished glass of about .0014 mole percent.

4. A clear, transparent, colorless glass consisting essentially of from about 17–37 mole percent lithium oxide, from about 1–15 mole percent alumina, from about 52–73 mole percent silica and from about $7 \times 10^{-5}$ to $7 \times 10^{-3}$ mole percent $Tb_2O_3$, said glass exhibiting a strong glow peak at 260–265° C. on heating after having been irradiated by high energy radiation.

5. A clear, transparent, colorless glass as defined in claim 4, in which the lithium oxide is about 29 mole percent, the alumina about 12 mole percent, the silica about 59 mole percent and the terbium oxide about $14 \times 10^{-4}$ mole percent.

References Cited

UNITED STATES PATENTS

| | | | |
|---|---|---|---|
| 2,447,322 | 8/1948 | Fonda | 252—301.6 |
| 2,470,451 | 5/1949 | Wood | 252—301.6 |
| 2,577,161 | 12/1951 | Smith | 252—301.4 |
| 3,097,172 | 7/1963 | Ginther | 252—301.4 |
| 3,260,675 | 7/1966 | McAllister | 252—301.4 |

TOBIAS E. LEVOW, *Primary Examiner.*

R. D. EDMONDS, *Assistant Examiner.*